(12) United States Patent
Bowen et al.

(10) Patent No.: US 9,039,302 B2
(45) Date of Patent: May 26, 2015

(54) INTERPOSER

(71) Applicant: Tyco Electronics Corporation, Berwyn, PA (US)

(72) Inventors: Terry Patrick Bowen, Dillsburg, PA (US); Heidi Linch Reynolds, Palo Alto, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/804,469

(22) Filed: Mar. 14, 2013

(65) Prior Publication Data

US 2014/0193123 A1 Jul. 10, 2014

Related U.S. Application Data

(63) Continuation-in-part of application No. 13/524,829, filed on Jun. 15, 2012, now Pat. No. 8,821,040.

(51) Int. Cl.
*G02B 6/36* (2006.01)
*G02B 6/43* (2006.01)
*G02B 6/42* (2006.01)

(52) U.S. Cl.
CPC ............. *G02B 6/425* (2013.01); *G02B 6/3644* (2013.01); *G02B 6/4292* (2013.01); *G02B 6/43* (2013.01); *G02B 6/3652* (2013.01)

(58) Field of Classification Search
CPC .............................. G02B 6/425; G02B 6/3652
See application file for complete search history.

(56) References Cited

U.S. PATENT DOCUMENTS

| | | | | |
|---|---|---|---|---|
| 6,328,484 | B1 * | 12/2001 | Uebbing | 385/93 |
| 7,221,816 | B2 | 5/2007 | Murayama | |
| 7,665,905 | B2 | 2/2010 | Tamura et al. | |
| 7,720,337 | B2 * | 5/2010 | Lu et al. | 385/52 |
| 2004/0047538 | A1 | 3/2004 | Howland et al. | |
| 2012/0170887 | A1 | 7/2012 | Yang et al. | |

* cited by examiner

*Primary Examiner* — Omar R Rojas (57) ABSTRACT

An interposer comprising: (a) a planar substrate having top and bottom surfaces, said bottom surface defining at least one ferrule alignment structure, and one or more fiber bores extending from said bottom surface to said top surface, each fiber bore being in a certain position relative to said ferrule alignment structure and adapted to receive a fiber; (b) one or more lenses on or near said top surface, each lens aligned with one of said fiber bores; (c) at least one ferrule having an end face and comprising one or more fibers protruding from said end face, and at least one alignment feature cooperating with said ferrule alignment structure to position said ferrule precisely on said bottom surface such that said fibers are disposed in said fiber bores and are optically coupled with said lenses; and (d) at least one optical component having one or more optical interfaces and being mounted on said top surface such that each of said optical interfaces is aligned with one of said fiber bores and is optically coupled with one of said lenses corresponding to said one of said fiber bores.

20 Claims, 6 Drawing Sheets

INTERPOSER

REFERENCE TO RELATED APPLICATION

This application is a continuation-in-part and claim priority to U.S. patent application Ser. No. 13/524,829, filed Jun. 15, 2012, hereby incorporated by reference in its entirety.

FIELD OF INVENTION

The subject matter herein relates generally to fiber optic substrates, and more particularly, to a planar interposer with optical components mounted on one side and a fiber array mounted on the opposite side.

BACKGROUND OF INVENTION

Fiber optic components are used in a wide variety of applications. The use of optical fibers as a medium for transmission of digital data (including voice, internet and IP video data) is becoming increasingly more common due to the high reliability and large bandwidth available with optical transmission systems. Fundamental to these systems are optical subassemblies for transmitting and/or receiving optical signals. Optical subassemblies typically comprise an interposer. As used herein, an interposer functions as a substrate for optical, opto-electrical, and electrical components and provides interconnections to optically and/or electrically interconnect the optical/opto-electrical/electrical components. There is a general need to simplify both the design and manufacture of interposers. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, the invention relates to an interposer comprising: (a) a planar substrate having top and bottom surfaces, the bottom surface defining at least one ferrule alignment structure, and one or more fiber bores extending from the bottom surface to the top surface, each fiber bore being in a certain position relative to the ferrule alignment structure and adapted to receive a fiber; (b) at least one ferrule having an end face and comprising one or more fibers protruding from the end face, and at least one alignment feature cooperating with the ferrule alignment structure to position the ferrule precisely on the bottom surface such that the fibers are disposed in the fiber bores and protrude past the top surface; and (c) at least one optical component having one or more optical interfaces and being mounted on the top surface such that each of the optical interfaces is aligned with one of the fiber bores and is optically coupled with a fiber protruding from the fiber bores.

In another embodiment, the interposer comprises: (a) a planar substrate having top and bottom surfaces, the bottom surface defining at least one ferrule alignment structure, and one or more fiber bores extending from the bottom surface to the top surface, each fiber bore being in a certain position relative to the ferrule alignment structure and adapted to receive a fiber; (b) one or more lenses on or near the top surface, each lens aligned with one of the fiber bores; (c) at least one ferrule having an end face and comprising one or more fibers protruding from the end face, and at least one alignment feature cooperating with the ferrule alignment structure to position the ferrule precisely on the bottom surface such that the fibers are disposed in the fiber bores and are optically coupled with the lenses; and (d) at least one optical component having one or more optical interfaces and being mounted on the top surface such that each of the optical interfaces is aligned with one of the fiber bores and is optically coupled with one of the lenses corresponding to the one of the fiber bores.

In yet another embodiment, the interposer is adapted for connection to a ferrule and comprises: (a) a planar substrate having top and bottom surfaces, said bottom surface defining at least one ferrule alignment structure for cooperating with an alignment feature of a ferrule, and one or more fiber bores extending from said bottom surface to said top surface, each fiber bore being in a certain position relative to said ferrule alignment structure and adapted to receive a fiber held in said ferrule; (b) one or more lenses on or near said top surface, each lens aligned with one of said fiber bores; and (c) at least one optical component having one or more optical interfaces and being mounted on said top surface such that each of said optical interfaces is aligned with one of said fiber bores and is optically coupled with one of said lenses corresponding to said one of said fiber bores.

DETAILED DESCRIPTION

Figure 1:
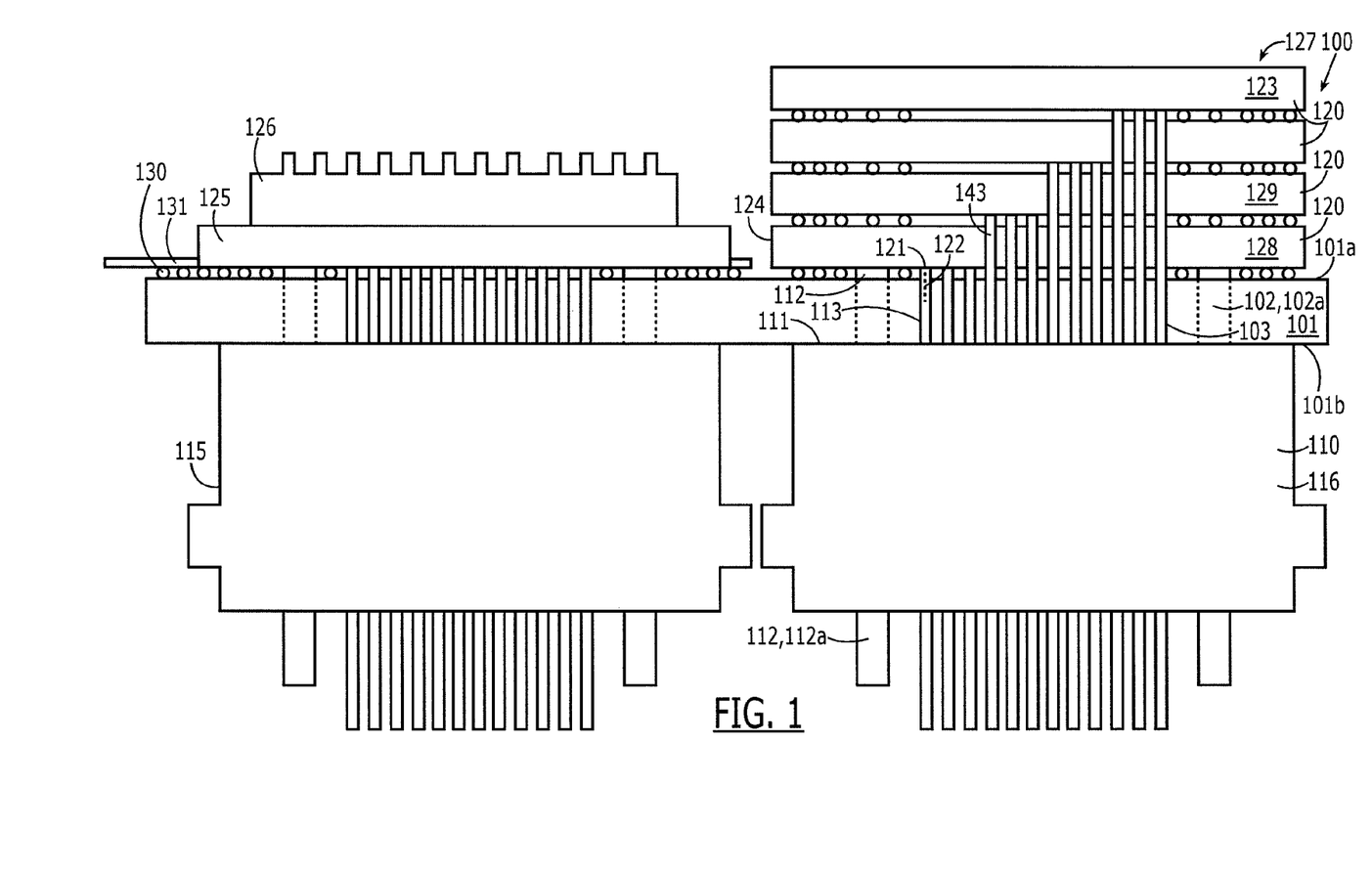
FIG. 1 shows one embodiment of the interposer of the present invention in which ferrule fibers extend through vias in optical components to optically connect the optical components.

Referring to FIG. 1, one embodiment of an interposer 100 of the present invention is shown. The interposer 100 comprises a planar substrate 101 having top and bottom surfaces 101a, 101b. The bottom surface 101b defines at least one ferrule alignment structure 102, and one or more fiber bores 103 extending from the bottom surface 101b to the top surface 101a. Each fiber bore 103 is in a certain position relative to the ferrule alignment structure 102 and is adapted to receive a fiber 113. The interposer also comprises at least one ferrule 110 having an end face 111 and containing one or more fibers 113 protruding from the end face 111. The ferrule 110 also comprises at least one alignment structure 102 cooperating with the ferrule alignment structure 102 of the substrate 101 to position the ferrule 110 precisely on the bottom surface 101b such that the fibers 113 are disposed in the fiber bores 103 and protrude past the top surface 101a. The interposer also comprises at least one optical component 120 having one or more optical interfaces 121 and being mounted on the top surface 101a such that each of the optical interfaces 121 is aligned with one of the fiber bores 103 and is optically coupled with a fiber 113 protruding from the fiber bores.

Figure 5:
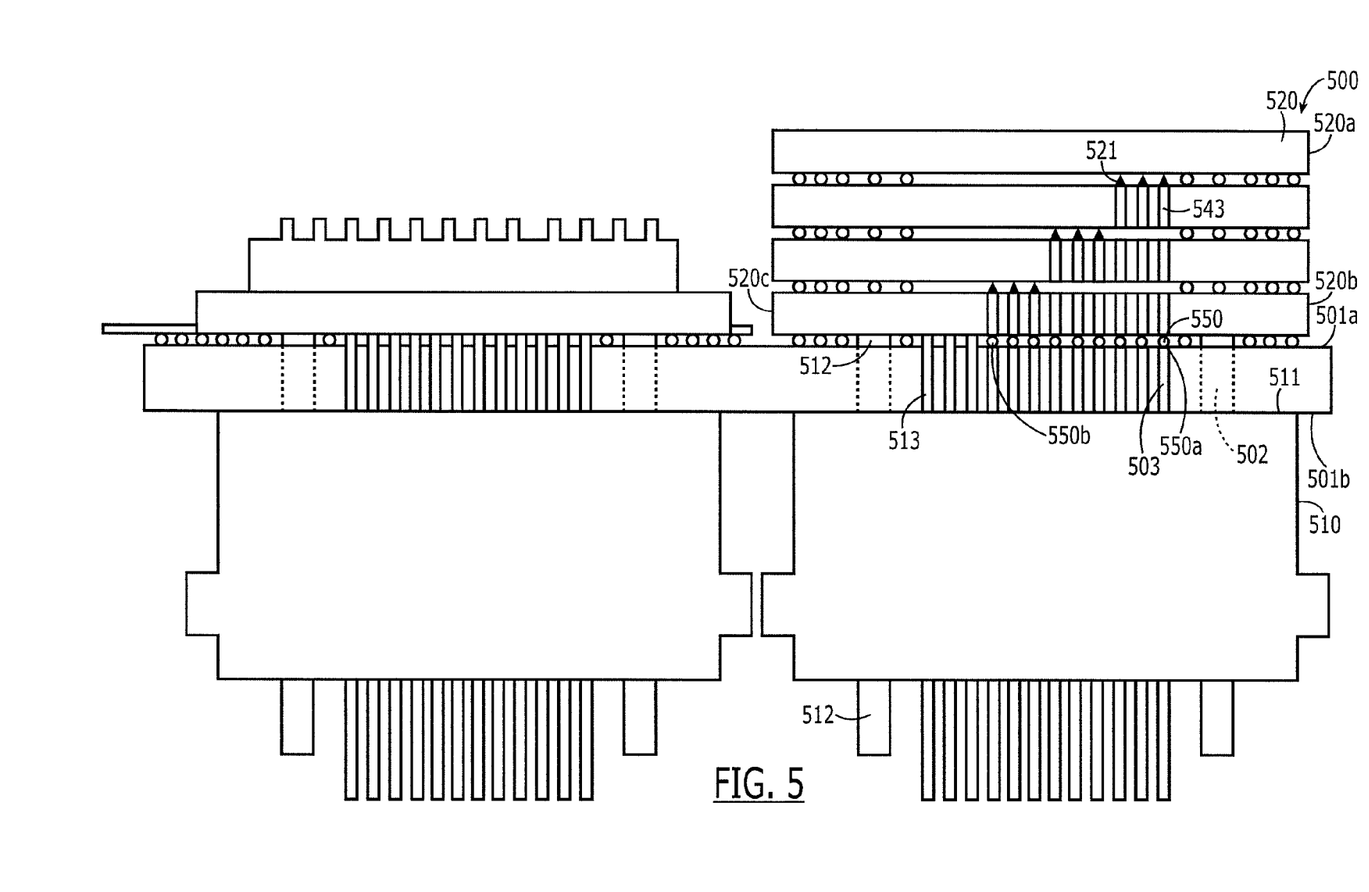
FIG. 5 shows another embodiment of the interposer of the present invention in which lenses optically couple fibers in a ferrule with optical components through vias in the optical components.

Referring to FIG. 5 another embodiment of the interposer 500 is shown in which lenses optically couple the fibers with the optical interfaces 521. The interposer 500 comprises a planar substrate 501 having top and bottom surfaces 501a, 501b. The bottom surface 501b defines at least one ferrule alignment structure 502, and one or more fiber bores 503 extending from the bottom surface 501b to the top surface 501a. Each fiber bore 503 is in a certain position relative to the ferrule alignment structure 502 and is adapted to receive a fiber 513. The interposer also comprises one or more lenses 550 on said top surface 501a, each lens 550 aligned with one of said fiber bores. The interposer also comprises at least one ferrule 510 having an end face 511 and containing one or more fibers 513 protruding from the end face 511. The ferrule 510 also comprises at least one alignment feature 512 cooperating with the ferrule alignment structure 502 of the substrate 501 to position the ferrule 510 precisely on the bottom surface 501b such that the fibers 513 are disposed in the fiber bores 503 and are optically coupled with said lenses. The interposer also comprises at least one optical component 520 having one or more optical interfaces 521 and being mounted on the top surface 501a such that each of the optical interfaces 521 is aligned with one of the fiber bores 503 and is optically coupled with one of the lenses corresponding to said one of said fiber bores.

Each of these elements is considered in greater detail below.

The substrate 101, 501 serves a number of purposes. For simplicity purposes, the functionality of the substrate is described in connection with the embodiment of FIG. 1, although such functionality applies as well to the other embodiments of this disclosure. The primary purpose of the substrate is to function as the backbone of the interposer 100 to support, secure, align and interconnect the ferrule 110, optical components 120, and supporting electrical circuitry 130. Accordingly, it should be a relatively rigid material that is thermally stable, and suitable for being heated to temperatures typical in solder reflow applications. In one embodiment, the substrate also functions as an insulator for electrical circuitry and thus should be a good dielectric. Suitable materials that are both rigid and relatively inexpensive include, for example, various types of glass, ceramics, quartz, polysilicon, amorphous silicon, and silicon. In one particular embodiment, the substrate 101 is glass, which has the benefit of being particularly rigid, inexpensive, a good dielectric, and optically transparent.

The substrate 101 defines alignment features to ensure alignment between the fibers 113 in the ferrule 110 and the corresponding optical interfaces 121 on the optical components 120. To this end, the substrate 101 comprises ferrule alignment structures 102 to align the ferrule 110 on its bottom surface 101b. Alignment structures for aligning ferrules are well known and include, for example, alignment pins/guide holes, alignment sleeves, plug/socket structures, and pins with v-groove structures. In the embodiment shown in FIG. 1, the substrate 101 defines one or more guide holes to receive alignment pins 112a of the ferrule. Such an alignment configuration is known in connection with mating MT ferrules. It should be understood that, while the substrate 101 is shown having guide holes 102a, the guide holes 102a may instead be occupied with alignment pins and the alignment pins 112a in the ferrule 110 be removed to leave an alignment hole in the ferrule available to receive the alignment pin disposed in the substrate. In such an embodiment, if the alignment pins extend significantly beyond the bottom and top surfaces, they function not only to align the ferrule on the bottom surface 101b, but also to align the optical components on the top surface. Still other embodiments will be obvious to one of skill in the art in light of this disclosure.

In one embodiment, the substrate 101 also functions to align the fibers 113 with the optical interfaces 121 of the optical components by using the fiber bores 103 in the substrate 101 as shown in FIG. 1. In this embodiment, the fiber bores 103 are disposed precisely with respect to the guide holes 102a. As discussed below, this is critical because the ferrule holds the fibers in a precise location with the respect to the alignment features. Therefore, if the substrate defines fiber bores in a precise location with respect to its ferrule alignment features, the fibers in the ferrule should align with the fiber bores in the substrate. The fibers 113 protruding from the ferrule end face 111 are received in the fiber bores 103 and are guided through the fiber bores to a precise position on or near the top surface 101a of the substrate. In the embodiment shown in FIG. 1, the fibers continue to extend from the top surface to optically couple with the optical components as discussed below. In another embodiment, as shown in FIG. 5, the fiber bores 503 terminate at or just under the top surface 501a such that the fibers extend to a point at or below the top surface to optically couple with a corresponding lens on or above the top surface.

With respect to the embodiment of FIG. 5, lenses are used to focus the light between the substrate top surface and the optical interface 521 of the optical component 520. As shown in FIG. 5, this distance can vary depending upon the position of a particular optical component in a stack of optical components. Thus, in one embodiment, each lens is configured with a focal length to optimize optical coupling with its respective optical component. For example, lens 550a will have a longer focal length than lens 550b because its respective optical component 520a is higher in the stack relative to the optical component 520b corresponding to lens 550b. Lenses of various diameters or various values of index of refraction can be used to provide differing focal lengths for the lenses. In this respect, if the optical component is immediately adjacent the top surface 501a, as is optical component 520c, then a lens may not be required and the fiber 513 can interface directly with the optical component by extending through the top surface 501a as shown in FIG. 5. Thus, the type of optical coupling among the different optical components may vary in the interposer 500 depending on the distance between the top surface 501a and the optical interface of a particular optical component.

Various techniques may be used to form the lenses. For example, the lenses may be refractive or diffractive, they may be discrete or integral to the substrate, and they may be formed of different materials. For example, in one embodiment, the substrate comprises an optically transparent material, such as glass, and the lenses are etched in the substrate. Suitable etching techniques include, for example, gray-scale etching, which allows for curved surfaces to be formed. Although such an embodiment is attractive from the standpoint of simplicity of the final product (i.e., the lenses are integral to the substrate), such gray-scale etching techniques can be complex and are often conducted under different conditions than the conventional wet etching described below. Additionally, because the refractive index between air and glass is relatively close, the use of lenses formed in the glass substrate requires significant curvature to achieve relatively short focal lengths.

In another embodiment, the lens is added to the top surface 501a of the substrate 501. For example, in one embodiment, a plurality of polymeric columns are disposed on the surface of the substrate and then reflowed such that the columns form curved surfaces. Specifically, polymer or co-polymer is patterned with good registration and with variations in volume if needed. After patterning, the polymer material can be thermally flowed to obtain a desired lens shape. Various techniques may be used to control the flow to achieve the desired lens shape. For example, the structure and cross-link controlled flow characteristics of the patterned co-polymer, along with the surface tension properties of the substrate and the polymer material can be used to tune the shape of the polymer lens to achieve the desired optical parameters. Furthermore, surface coatings or concentric rings of etched features or dispositive material and be applied to the substrate as a method of controlling the spread of the polymer during thermal flow. This approach is advantageous in that the patterning of the polymer may be defined in the photolithography process described below. However, this approach may be complicated by the extensive variables associated with the reflow step and, thus, the ability to form lenses having different focal lengths may be limited. Alternatively, the polymer lens material can be deposited using a dispense technology.

In yet another embodiment, the lens is a diffractive pattern applied to the substrate. This approach involves applying a material having a relatively-high refractive index during the photolithography process described below. For example, in one embodiment, a photo resist is patterned over a layer of high refractive index material, such as amorphous silicon. Each pattern corresponds to a particular lens having certain focal length. The high-refractive index material that is not protected by the photo resist is then etched or otherwise removed to define the pattern. This lens configuration is particularly advantageous because it uses well known techniques and materials, and produces lenses having a wide range of focal lengths, including particularly short focal lengths, which might otherwise pose difficulty for a refractive lens. Techniques for forming diffractive gratings are described, for example, in U.S. Pat. No. 4,895,790, hereby incorporated by reference.

In yet another embodiment, the lens is not defined on the substrate, but rather is defined on the end of the fiber. In such an embodiment, the fiber bore 503 extends through the top surface 501a such that the lens at the fiber end is not obstructed by the substrate. Techniques for forming a lens at the end of the fiber are well known and are described, for example, in U.S. Pat. No. 4,118,270, hereby incorporated by reference.

Still other techniques for forming the lenses will be obvious to one of skill in the art in light of this disclosure.

In one embodiment, the substrate also functions to align passively the optical components 120 on the top surface 101b such that the fibers 113 optically couple with the optical interfaces 121 of the optical components 120. This may be accomplished using a variety of techniques. For example, in one embodiment, a pattern of contact pads are used that passively align the optical device during a reflow operation. Specifically, the optical device is provided with a certain pattern of contact pads on its bottom, the interposer has the same pattern on its top planar surface. The optical device is then placed on the pads in rough alignment using known pick and place technology. Alignment between the interposer and optical device is then achieved when the assembly is reflowed such that the surface tension of the contact pads causes the patterns of the optical device to align over the pattern on the interposer, thereby precisely positioning the optical device relative to the fiber bores of the interposer. Such a mechanism is well known and disclosed for example in U.S. Pat. No. 7,511,258, incorporated herein by reference.

In another embodiment, rather than or in addition to contact pads, fiducials on the interposer may be used to facilitate passive alignment. Fiducials are any structure or marking which provides for the passive alignment of the optical device. For example, the fiducials may be physical structures protruding from the planar surface that provide a register surface against which the edge of the optical device may contact to be positioned correctly on the interposer. Alternatively, the fiducials may be markings to enable visual alignment of the optical device on the interposer using a commercially-available, ultra-high precision die bonding machine, such as, for example, a Suss MicroTec machine (See, e.g., U.S. Pat. No. 7,511,258).

Additionally, a combination of fiducials and contact pads may be used. For example, the pads may be used to pull the optical device into contact with the raised fiducials of the interposer. Still other alignment techniques will be apparent to one of skill in the art in light of this disclosure.

Therefore, the substrate 101 has one or more features for aligning the ferrule 110 to the bottom surface 101b and optical components 120 to the top surface 101a such that the fibers 113 of the ferrule optically couple with the optical components 120. The substrate may also support electrical circuitry for driving the optical components 120. For example, in FIG. 1, the top surface 101a has circuitry 130 including drivers to operate the optical components 120. In one embodiment, the associated circuitry 130 comprises traces and solder pads for interfacing the interposer with a higher level flex circuit 131 or printed circuit board.

The preparation of the substrate 101 can be performed in different ways. For example, the electrical circuitry can be applied through photolithography as is well known, and the ferrule alignment features and fiber bores can be defined using techniques known for defining bores in ceramics, glass and other known substrates, including, for example, laser drilling, electrical discharge machining (EDM), reactive ion etching (RIE), water jet with laser oblation, sand blasting, and photo structuring with chemical etching.

The interposer of the present invention also lends itself to economical and highly repeatable manufacturing. In one embodiment, a significant portion of the preparation of the interposer is performed at the wafer/panel stage. That is, rather than preparing each interposer as a discrete component, multiple interposers can be prepared simultaneously on a wafer/panel. This is a known technique to facilitate large-scale manufacturability. Benefits of wafer/panel fabrication include the ability to define multiple features and components on multiple interposers in one step. For example, most if not all of the critical alignment relationships may be defined on the wafer/panel scale, often in just a few, or even a single, photolithography step. Specifically, the location of the traces, contact pads for the optical components, the guide holes and fiber bores may be defined in a single masking and etching step. In one embodiment, even the edges of the interposers are defined in the same masking step. In other words, each edge of the interposer is one half of a groove etched in the wafer/panel. The wafer/panel is simply parted at the bottom of each groove to form interposers with precisely controlled edges. This way, the distance from the edge of the interposer to critical features may be precisely controlled, often in a single step, thereby eliminating tolerance build up and simplifying assembly manufacturing with the interposer by use of these precisely controlled edges. These advantages are expected to increase as the size of wafers/panels and their handling capabilities increase as well. Further economies may be realized by etching these features using the same photolithographic procedure. Although a single etching procedure may be used, in certain circumstances, two or more etching procedures may be beneficial.

The ferrule 110 functions to hold the fibers 113 in alignment relative to the alignment structure 102. The ferrule may be configured to hold one or a plurality of fibers. Ferrules are well known, and any known or later-developed ferrule can be used providing that the ferrule can interface with ferrule alignment features on the substrate. Suitable ferrule configures include, for example, MT ferrules, MPO ferrules, and MT-RJ ferrules. In the embodiment of FIG. 1, the ferrule 110 is an MT ferrule.

To effect optical coupling with the optical components, fibers 113 extend from the end face 111 of the ferrule 110. The extent to which the fiber extends will depend on the configuration of the optical component, such as whether the optical components are stacked or whether they comprise fiber stubs or optical waveguides as described below. In one embodiment, the fibers 113 are laser cleaved to the appropriate length. Methods for preparing a cleaved fiber protruding from a ferrule are known, and disclosed for example in U.S. Pat. No. 7,377,700, hereby incorporated by reference in its entirety. Furthermore, in an embodiment in which the fiber end face is laser cleaved, end-shaping techniques, such as those disclosed in U.S. Pat. No. 6,963,687 (hereby incorporated by reference in its entirety), may be used to shape the fiber end face with a lens or other structure to enhance optical coupling with the optical interface 121 of the optical component 120. For example, for a single mode fiber with an air gap between the fiber and optical interface 121, a slant or angle finish of the fiber end face will reduce back reflection.

The optical component 120 may be any known or later-developed component that can be optically coupled to a fiber. The optical device may be for example: (a) an optoelectric device (OED), which is an electrical device that sources, detects and/or controls light (e.g. photonics processor, such as, a CMOS photonic processor, for receiving optical signals, processing the signals and transmitting responsive signals, electro-optical memory, electro-optical random-access memory (EO-RAM) or electro-optical dynamic random-access memory (EO-DRAM), and electro-optical logic chips for managing optical memory (EO-logic chips), lasers, such as vertical cavity surface emitting laser (VCSEL), double channel, planar buried heterostructure (DC-PBH), buried crescent (BC), distributed feedback (DFB), distributed bragg reflector (DBR); light-emitting diodes (LEDs), such as surface emitting LED (SLED), edge emitting LED (ELED), super luminescent diode (SLD); and photodiodes, such as P Intrinsic N (PIN) and avalanche photodiode (APD)); (b) a passive component, which does not convert optical energy to another form and which does not change state (e.g., fiber, lens, add/drop filters, arrayed waveguide gratings (AWGs), GRIN lens, splitters/couplers, planar waveguides, or attenuators); or (c) a hybrid device which does not convert optical energy to another form but which changes state in response to a control signal (e.g., switches, modulators, attenuators, and tunable filters). It should also be understood that the optical device may be a single discrete device or it may be assembled or integrated as an array of devices.

Figure 6:
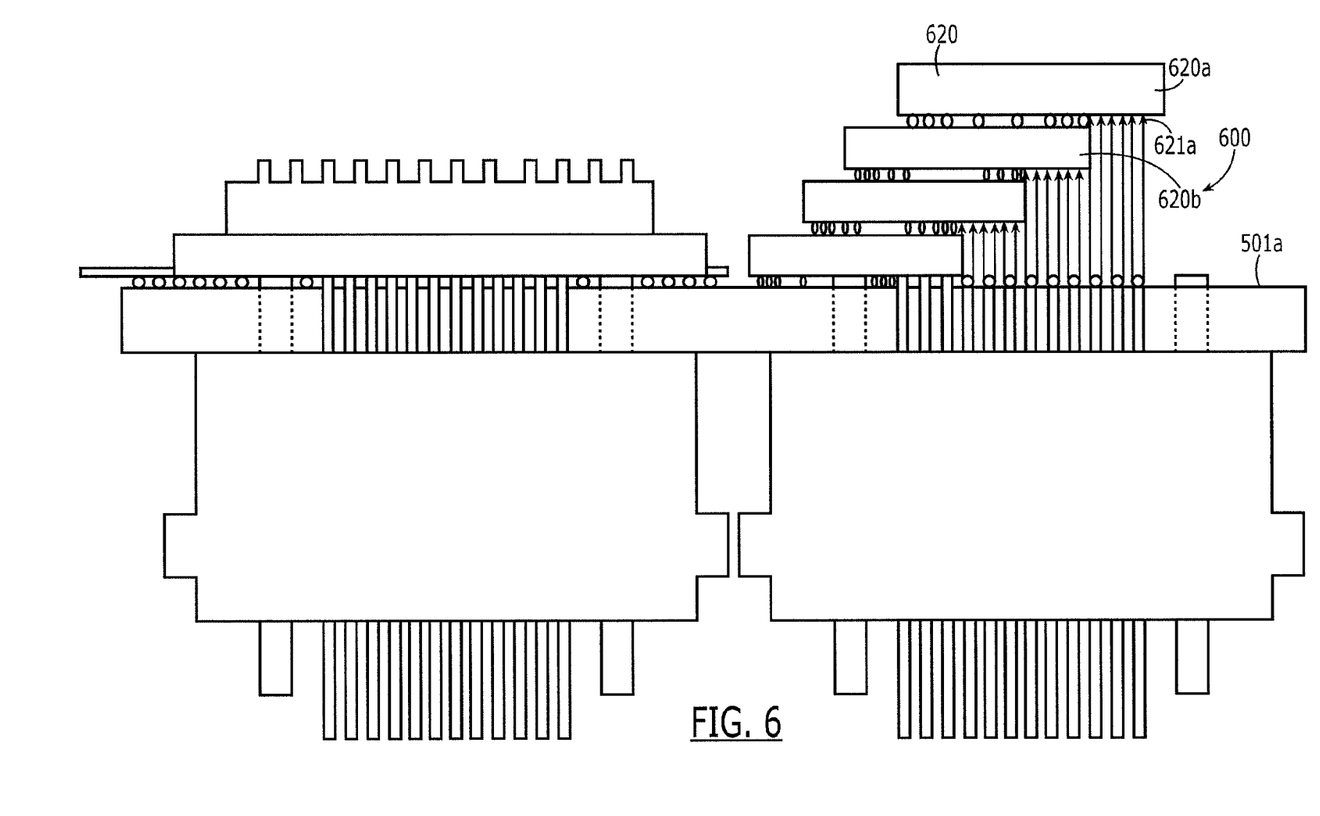
FIG. 6 shows an embodiment similar to that of FIG. 5 but staggers the optical components to eliminate the need for vias in the optical components as in FIG. 4.

The optical component 120 has at least one optical axis 122 along which the light propagates to/from the optical component. Because the optical component is typically planar and disposed over the substrate, generally, although not necessarily, the optical axis 122 is essentially perpendicular to the top surface 101a. In some embodiments, it may be preferable to use an optical component having an optical axis that is essentially parallel to the top surface 101a. In such an embodiment, a reflective surface in the optical component or in a discrete component may be used to bend the light between the fiber and the optical component. It should be understood that the optical component is not limited to a single optical axis, and often an optical component will have a plurality of optical axes as depicted in FIG. 1. The optical interface 121 is defined at each optical axis 122 on each optical component. For example, the optical component may have a plurality of input optical interfaces and a plurality of output optical interfaces. In the embodiments of FIGS. 5 and 6 in which lenses 550 are used to focus light on the optical interfaces 521 of the optical components 520, an optical interface 521 that transmits will also typically (although not necessarily) require lensing to optically couple with its respective fiber 513. The lens fabrication techniques discussed in connection with the lenses 550 can be used as well in forming lenses on the optical interfaces of the optical components 520.

Referring to FIG. 1, one embodiment of the interposer is shown in which a plurality of optical components 120 are disposed on the top surface 101a. In this particular embodiment, one of the optical components 120 is a CMOS photonics processor 125 with a heat sink 126. The optical processor is optically connected to a memory stack 127 via optical fibers 113 which are interfaced with the processor via ferrule 115 and interfaced with the memory stack 127 via ferrule 116. (It should also be understood that the optical connection between the processor and the memory stack may be a direct connection or it may be through a star coupler or other optical circuit (e.g., perfect shuffle) in which the processor 125 is optically connected to memory stacks on different substrates and the memory stack 127 is likewise optically coupled and accessible to other processors.) The memory stack 127 comprises a logic chip 128 and two or more DRAM 129 chips stacked on top. Although the stack depicted in FIG. 1 is a memory stack 127 other embodiments are possible. For example, the stack may comprise an array of VCSELs.

The configuration of the optical interconnection among the optical components 120 in the stack may vary. For purposes of nomenclature, referring to FIG. 1, a stack of optical components comprises a top optical component 123 and one or more lower optical components 124, including a bottom optical component. If the stack only has two optical components, then it has a bottom and top component, wherein the bottom optical component is also referred to as a lower optical component.

As shown in the embodiment of FIG. 1, the lower optical components 124 comprise one or more vias 143 aligned with the fiber bores 103. As shown in FIG. 1, fibers 113 extend through the vias 143 of lower optical components 124 to reach the optical component(s) above them. In one embodiment, the fibers extend through two or more aligned vias of two or more lower optical components.

Figure 2:
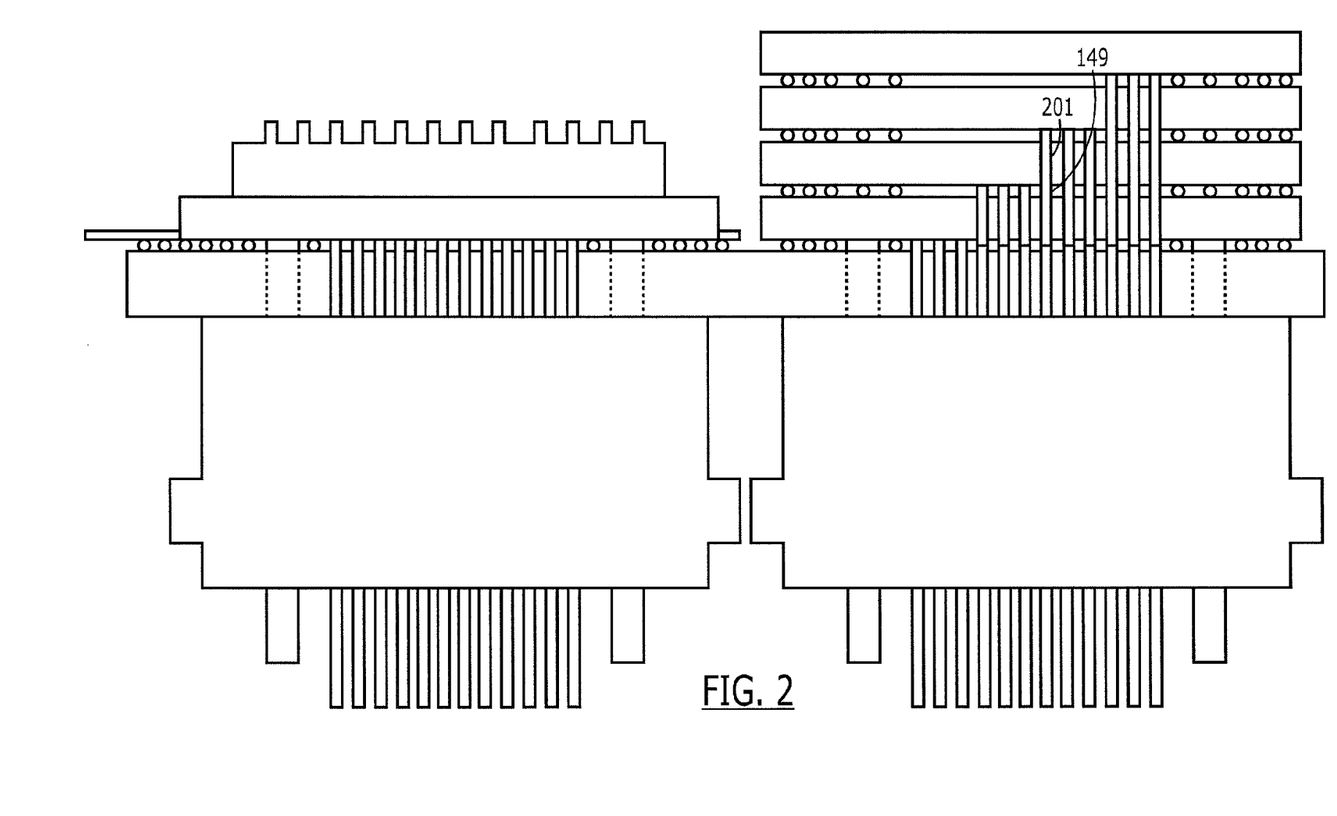
FIG. 2 shows an embodiment similar to that of FIG. 1 but uses fiber stubs in the vias to facilitate optical connection with the optical components.

In FIG. 1, the fibers extending through the vias of the optical components extend from the ferrule. Other embodiments exist. For example, referring to FIG. 2, rather than have a fiber extend from the ferrule end face all the way through multiple aligned vias, it may be preferable in some applications to dispose a fiber stub 201 in the aligned vias 143. In one embodiment, a common fiber stub extends between aligned vias of two or more optical components. If fiber stubs are used, the fibers protruding from the ferrule may be cleaved an equal distance from the ferrule end face, but with sufficient protrusion to optically couple with the fiber stubs. As is known in the art, the optical coupling between the fiber and the fiber stub may be improved using a refractive index matching gel.

Figure 3:
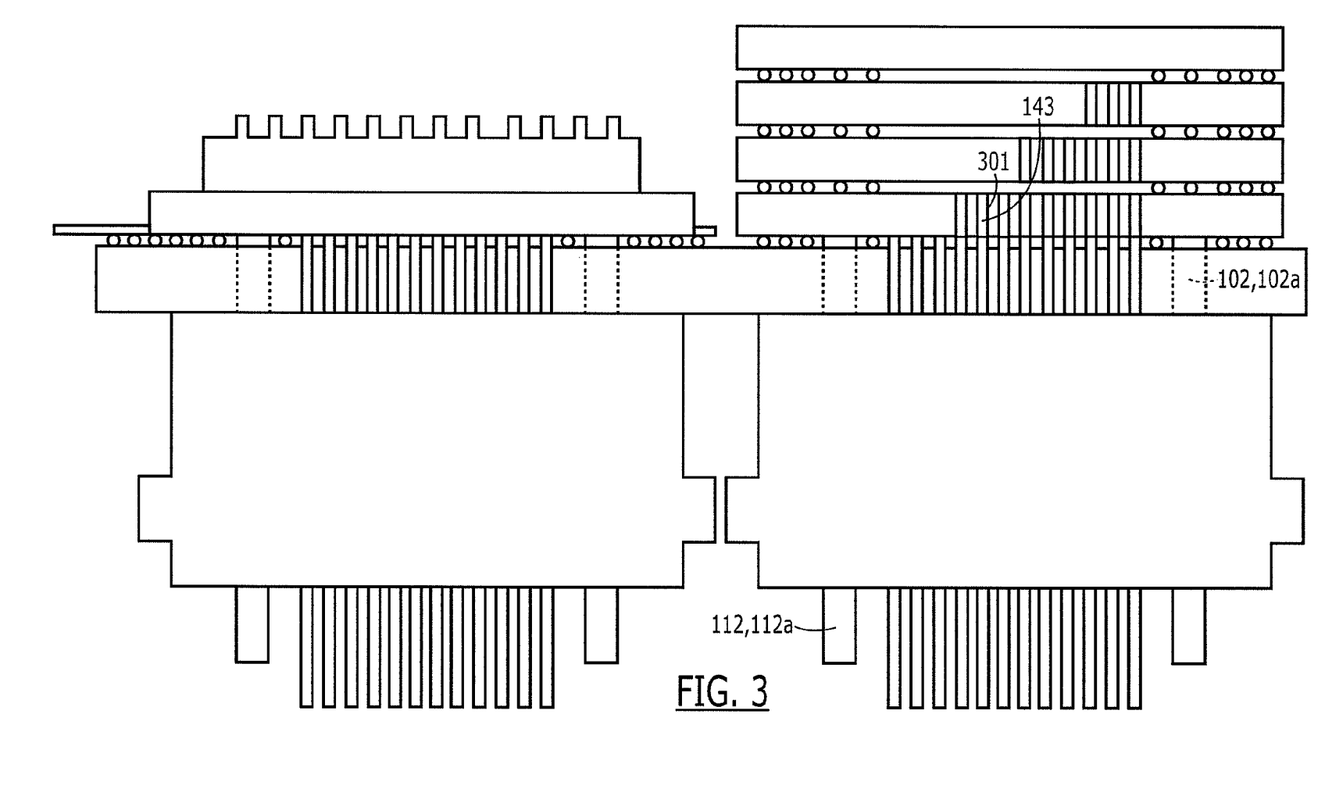
FIG. 3 shows an embodiment similar to that of FIG. 1 but uses hollow wave guides to facilitate optical connection with the optical components.

In yet another embodiment, the vias 143 are used as hollow waveguides 301 as shown in FIG. 3. Vias 543 are also disclosed in the interposer 500 embodiment of FIG. 5. To improve the performance of the waveguides, they may be metal-coated as is known in the art. In such an embodiment, it may be preferable to close the gap between optical components to improve the efficiency of the waveguides.

Figure 4:
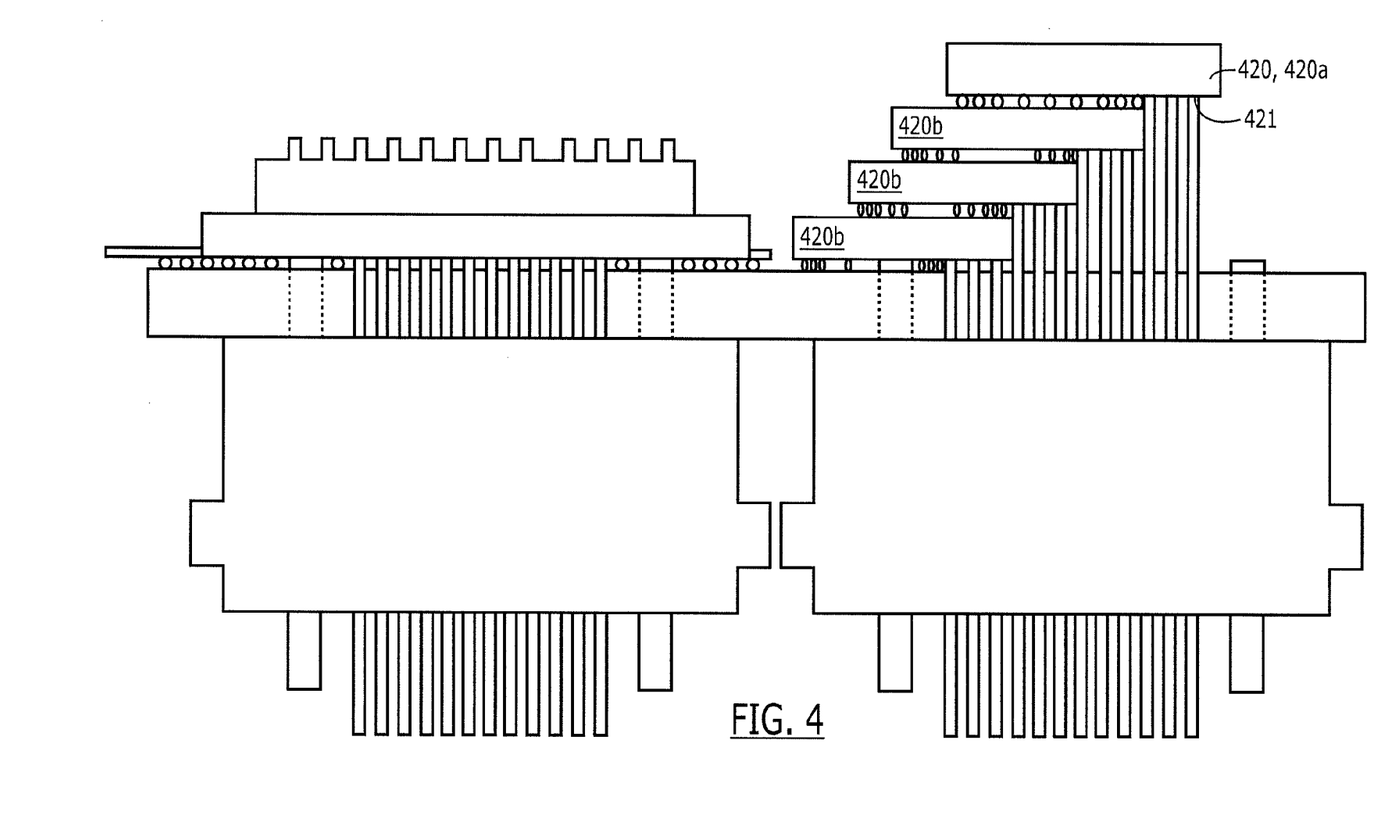
FIG. 4 shows an embodiment similar to that of FIG. 1 but staggers the optical components to eliminate the need for vias in the optical components.

In yet another embodiment, the need for vias through lower optical components is reduced or eliminated by staggering the optical components 420 as shown in FIG. 4. In this embodiment, one or more optical interfaces 421 of a given optical component 420a are unobstructed by optical components 420b between the given optical component 420a and the top surface 101a.

Similar to the embodiment of FIG. 4 is the embodiment of interposer 600 in FIG. 6. Like the optical components 420 in FIG. 4, the optical components 620 are staggered such that the optical interfaces 621a of a given optical component 620a are unobstructed by optical components 620b between the given optical component 620a and the top surface 501a.

Still other configurations for optically coupling a stack of optical components with the fibers in a ferrule coupled to the substrate will be obvious to one of skill in the art in light of this disclosure.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

What is claimed is:

1. An interposer, comprising:
   a planar substrate having top and bottom surfaces, said bottom surface defining at least one ferrule alignment structure, and one or more fiber bores extending from said bottom surface to said top surface, each of said one or more fiber bores being in a certain position relative to said ferrule alignment structure and adapted to receive a fiber;
   one or more lenses on or near said top surface, each lens aligned with one of said one or more fiber bores;
   at least one ferrule having an end face and comprising one or more fibers protruding from said end face, and at least one ferrule alignment feature cooperating with said ferrule alignment structure to position said ferrule precisely on said bottom surface such that said one or more fibers are disposed in said one or more fiber bores and are optically coupled with said one or more lenses; and
   at least one optical component having one or more optical interfaces and being mounted on said top surface such that each of said one or more optical interfaces is aligned with one of said one or more fiber bores and is optically coupled with one of said one or more lenses corresponding to said one of said one or more fiber bores.

2. The interposer of claim 1, wherein said one or more fiber bores terminates below said top surface.

3. The interposer of claim 2, wherein said substrate is glass and said one or more lenses are integral to said substrate.

4. The interposer of claim 3, wherein said one or more lenses comprises a pattern of material having a refractive index greater than glass.

5. The interposer of claim 4, wherein said material is amorphous silicon.

6. The interposer of claim 3, wherein said one or more lenses are etched to have a curved surface.

7. The interposer of claim 3, wherein said one or more lenses comprises a polymeric material.

8. The interposer of claim 7, wherein said one or more lenses are defined by reflowing a column of said polymeric material.

9. The interposer of claim 1, wherein said one or more lenses comprise a diffractive lens.

10. The interposer of claim 1, wherein said one or more lenses comprise a refractive lens.

11. The interposer of claim 1, wherein said one or more lenses are discrete from said substrate.

12. The interposer of claim 1, wherein said one or more guide fiber bores extend from said bottom surface through said top surface.

13. The interposer of claim 12, wherein said one or more lenses are integral with said one or more fibers.

14. The interposer of claim 1, wherein said one or more lenses are disposed on the top surface of said substrate.

15. The interposer of claim 1, wherein said one or more lenses comprise a plurality of lenses having different focal lengths, the focal length for a particular lens of said plurality of lenses corresponding to the distance between said particular lens and an optical interface aligned with said particular lens.

16. The interposer of claim 15, wherein an airgap exists between said particular lens and said optical interface.

17. The interposer of claim 1, wherein said at least one optical component comprises a plurality of stacked optical components.

18. The interposer of claim 17, wherein said stacked optical components comprise a top optical component and one or more lower optical components, including a bottom optical component.

19. The interposer of claim 18, wherein at least one of said lower optical components comprises one or more vias, each via aligned with one of said one or more fiber bores and an optical interface of an optical component above said at least one of said lower optical components.

20. The interposer of claim 18, wherein said stacked optical components are staggered such that one or more optical interferences of a given optical component are unobstructed by optical components between said given optical component and said top surface.

* * * * *